Feb. 20, 1951  T. J. NUSSDORFER, JR  2,542,051
LOW FRICTION JOURNAL BEARING
Filed Aug. 1, 1949
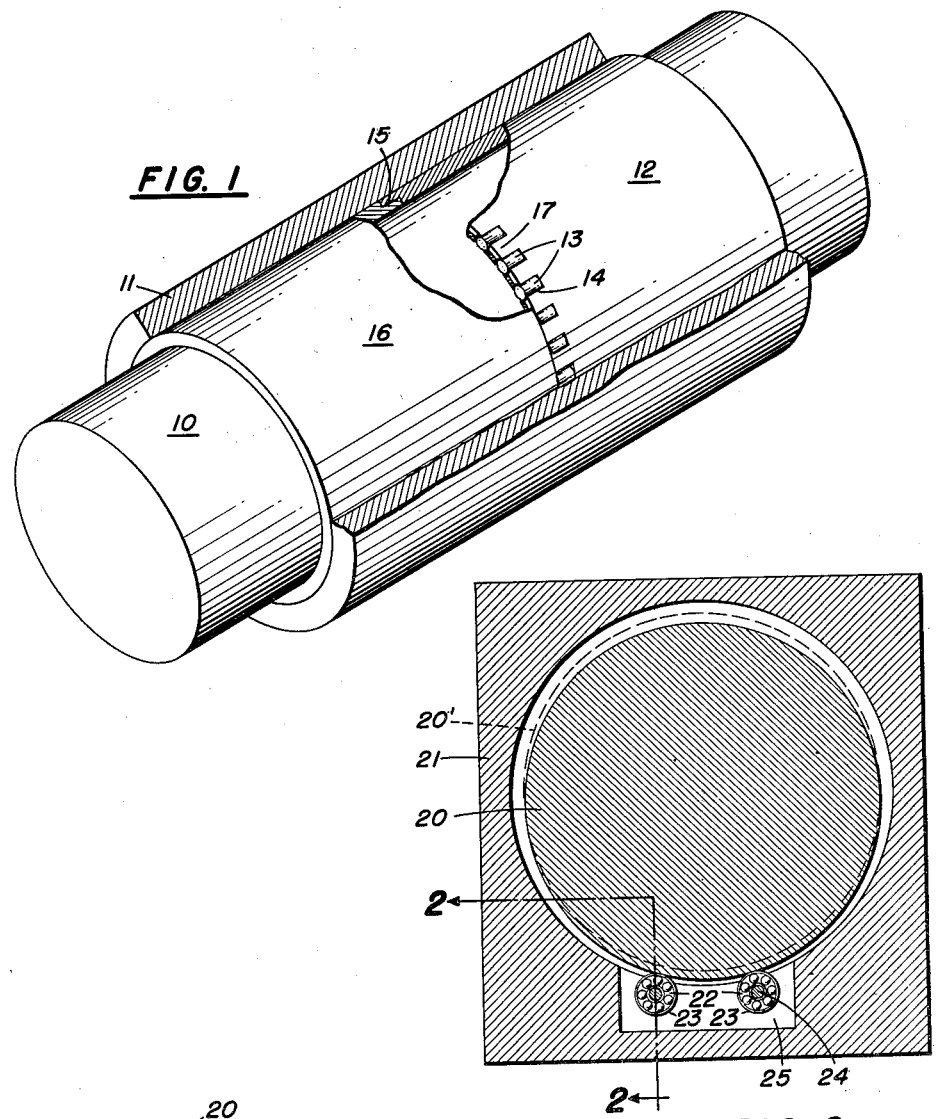
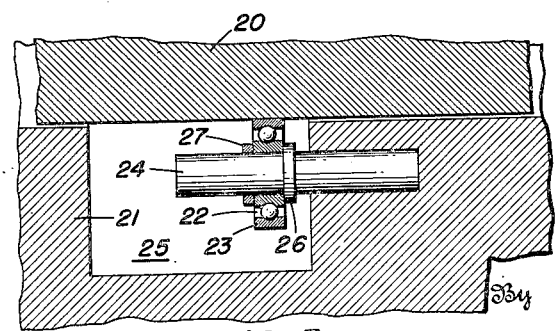
Inventor
THEODORE J. NUSSDORFER, JR Patented Feb. 20, 1951

2,542,051

UNITED STATES PATENT OFFICE 2,542,051

LOW FRICTION JOURNAL BEARING

Theodore J. Nussdorfer, Jr., Elyria, Ohio

Application August 1, 1949, Serial No. 107,977

3 Claims. (Cl. 308—35)

(Granted under the act of March 3, 1883, as amended April 30, 1928; 370 O. G. 757)

This invention relates generally to journal bearings and specifically to journal bearings for high speed rotation.

In plain journal bearings high starting torques are required to break the metal-to-metal contact of the shaft with the bearings.

Marring or scuffing of the bearing frequently occurs before an oil film is established between the two parts. Roller bearings are frequently used in place of journal bearings but at high speeds they are subject to fatigue and breakage.

Full-floating bearings having floating sleeves are likewise subject to damage during starting, due to the failure of the sleeve to rotate when the shaft is rotated. Sudden applications of loads also damage the surfaces of the shaft and the sleeve in such a bearing.

An object of this invention is to provide a journal bearing having a low starting torque capable of high speed operation.

Another object of the invention is to provide a bearing using roller or ball bearings at low speeds and operating as a journal bearing at high speeds.

A further object of the invention is to provide a journal bearing having no metal-to-metal contact of the bearing and shaft surfaces at periods of rest or of low speeds.

Another object of the invention is to provide a journal bearing having a sleeve with roller bearings incorporated therein so that no damage occurs to the sleeve or bearing surface when the shaft starts to rotate.

Another object of the invention is to allow the use of closer fits between the shaft and bearing than is usual in journal bearings at present in use.

Other objects and advantages of the invention will hereinafter become more fully apparent from the following description of the annexed drawings, which illustrate preferred embodiments, and wherein:

Fig. 1 is an isometric view partly in section of one embodiment of the invention.

Fig. 2 is an end view in section of another embodiment of the invention, and

Fig. 3 is a side view in section taken on line 2—2 of Fig. 2.

Referring more particularly to the drawing in Fig. 1, a shaft 10 is shown in bearing housing 11 and separated therefrom by sleeves 12 and 16 which are axially aligned by the overlap 15 where they join. Roller bearings 13 fit into recesses 14 formed so as to prevent movement outwardly of the roller bearings 13 under centrifugal force.

The roller bearings 13 support the shaft 10 in the sleeves 12 and 16 in such a manner as to prevent metal-to-metal contact of shaft 10 with sleeves 12 and 16 at periods of rest and with such close tolerances that at high speeds of rotation an oil film separates shaft 10 from sleeves 12 and 16 and sleeves 12 and 16 from housing 11 and the roller bearings 13 are free of any pressure.

In Fig. 2, another embodiment of the invention is shown with shaft 20 shown at rest in bearing 21 and the space between greatly exaggerated in order that the relative positions of the parts be more fully understood. A dotted line 20' shows the position of the shaft 20 at normal and high speed operation with oil or other lubricant (not shown) supporting the shaft 20 in the bearing 21 in the conventional manner.

Ball-bearings 22 in their races 23 are rotatably mounted on pinions 24 mounted in the bearing 21 in the recess 25 therein provided and are held on the pinions 24 by collars 26 and 27 as shown in Fig. 3. At positions of rest the ball-bearings 22 and races 23 support the shaft 20 but are relieved of any contact, stress or strain by the movement of the shaft 20 to the position shown by dotted line 20' when it is rotated, due to the oil or lubricant forming a film between the shaft 20 and bearing 21.

Various modifications in the arrangement and proportions of the parts of the combination may be made without departing from the spirit and scope of the present invention as defined by the appended claims.

The invention described herein may be manufactured and used by or for the Government of the United States of America for governmental purposes without the payment of any royalties thereon or therefor.

What is claimed is:

1. In combination with a journal bearing having a housing and a shaft, a free-floating bearing interposed between said housing and shaft comprising a pair of bearing sleeves on said shaft adjacent one another and having an overlap and underlap formed in their meeting edges, and roller bearings positioned in recesses formed in the overlapped edges of said pair of bearing sleeves, said roller bearings having a diameter larger than the thickness of either of said bearing sleeves but of less diameter than the thickness of said sleeves plus a load supporting oil film on each side of said sleeves separating said sleeves from said housing and said shaft in a free-floating condition.

2. A free-floating bearing to be interposed between a shaft and a journal comprising two sleeves positioned on said shaft adjacent one another and dimensioned relative to said shaft and said journal as to be free-floating on wedge-shaped oil films under conditions of high speed, and separate bearing means formed in the meeting edges of said sleeves adapted to support said shaft in said journal independent of either of the interposed sleeves under conditions of rest and relatively low speeds when no oil film is present.

3. A free-floating bearing to be used between a journal and a shaft having a relatively heavy loading comprising two bearing sleeves of like diameter, a male shoulder formed on one end of one sleeve, a matching female shoulder formed on one end of the other sleeve, a plurality of arcuate recesses formed in both sleeves in the overlapping portions formed by said shoulders, and a roller bearing positioned in each of said recesses, the dimensions of said sleeves and said roller bearings relative to said journal and said shaft being such that said roller bearings support said shaft in said journal at conditions of rest and provide relatively friction-less starting and low speed rotation of said shaft but are free of load-bearing contact with said shaft and journal at high rotational speeds of said shaft when a load-bearing lubricating film of oil is formed and manintained between said sleeves and said journal and between said sleeves and said shaft.

THEODORE J. NUSSDORFER, Jr.

REFERENCES CITED

The following references are of record in the file of this patent:

UNITED STATES PATENTS

| Number | Name | Date |
|---|---|---|
| 1,121,083 | DeFerranti | Dec. 15, 1914 |
| 1,946,652 | Wallgren | Feb. 13, 1934 |
| 2,309,397 | Illmer | Jan. 26, 1943 |